W. BROWN.
Bee Feeder.
No. 24,516. Patented June 21, 1859.
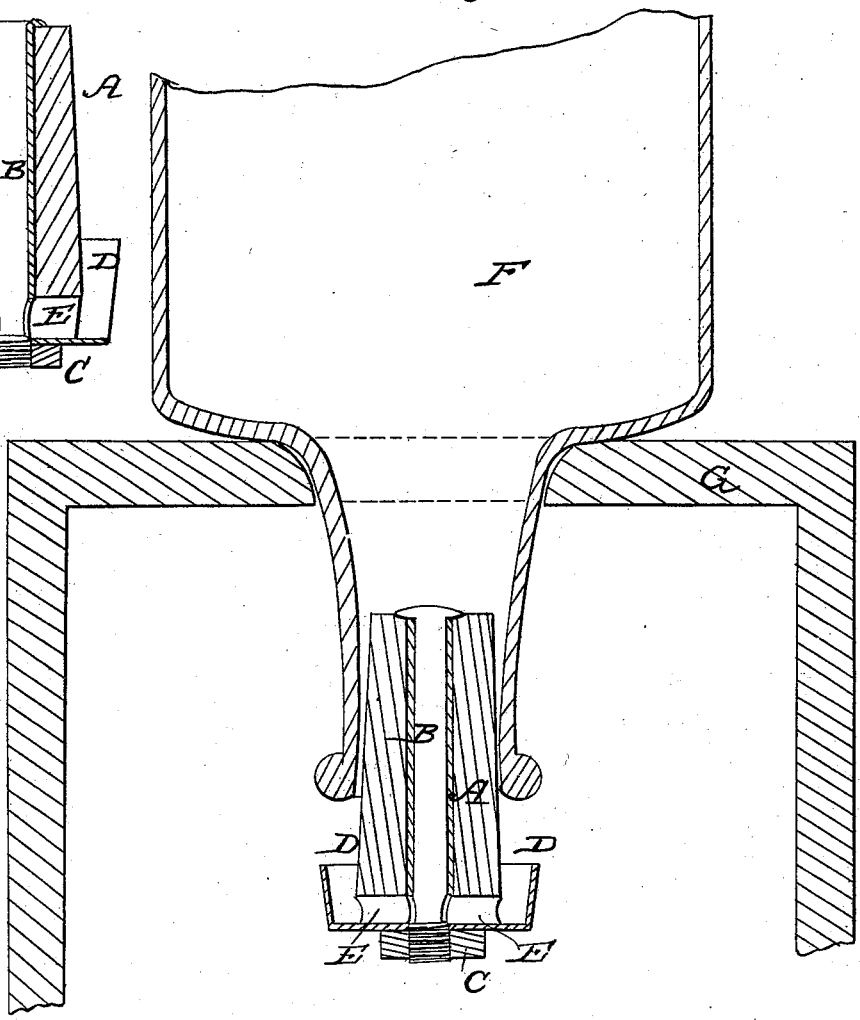

UNITED STATES PATENT OFFICE.

WILLIAM BROWN, OF SHELBYVILLE, INDIANA, ASSIGNOR TO HIMSELF AND FOUNTAIN G. ROBERTSON, OF SAME PLACE.

DEVICE FOR FEEDING BEES.

Specification of Letters Patent No. 24,516, dated June 21, 1859.

*To all whom it may concern:*

Be it known that I, WILLIAM BROWN, of Shelbyville, in the county of Shelby and State of Indiana, have invented a new and useful Improvement in Devices for Feeding Bees from an Inverted Bottle, of which the following is a full and exact description, reference being had to the accompanying drawings and the letters marked thereon.

Figures 1 and 2 are sectional drawings showing the construction and operation of the apparatus.

A is a cork stopper with a hole drilled through the center for the purpose of admitting the tube B, which is flanged upon the top for the purpose of holding the cork A. Upon the lower edge of the tube B, is the nut or tap C, which holds the cork firmly to the bottom of the cup D, D. The passages E and E allow the feed to flow into the cup D D as it passes through the tube B from the bottle F.

The advantages of this apparatus will be seen by its operation. The cork A being fitted into the neck of the bottle F, the feed is allowed to pass down or through the tube B, and the passages E and E into the cup D D, until the same is filled above the passages E and E thus cutting off the supply of air from the bottle F, thereby preventing the flow of feed into the cup D D, faster than the bees eat the same. The application of this apparatus to the bee hive is as follows. The same being placed in the neck of a bottle as you would place a cork stopper for the purpose of preserving liquids, the bottle is then turned upside down and the neck of the same placed through a hole bored in the top of the hive entirely closing the same.

Having thus described my improved device for feeding bees, I would state that I am aware that an inverted bottle has been used with a trough, for the same purpose. I do not, therefore, claim the use of an inverted bottle for feeding bees by atmospheric pressure, but

I do claim,

As a new article of manufacture, the bottle stopper, consisting of the cork A, tube B, and cup D, D, secured together by the screw and nut C, substantially as described and for the purposes specified.

WILLIAM BROWN.

Witnesses:
F. G. ROBERTSON,
W. J. WINGATE.